(12) United States Patent
Griswold

(10) Patent No.: US 7,055,172 B2
(45) Date of Patent: May 30, 2006

(54) PROBLEM DETERMINATION METHOD SUITABLE FOR USE WHEN A FILTER BLOCKS SNMP ACCESS TO NETWORK COMPONENTS

(75) Inventor: Douglas Edmund Griswold, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 10/214,542

(22) Filed: Aug. 8, 2002

(65) Prior Publication Data

US 2004/0030924 A1  Feb. 12, 2004

(51) Int. Cl.
*G06F 1/24* (2006.01)

(52) U.S. Cl. .......................... 726/3; 713/200; 713/201

(58) Field of Classification Search .................. 726/3; 713/200, 201
See application file for complete search history.

(56) References Cited

U.S. PATENT DOCUMENTS

| | | | |
|---|---|---|---|
| 4,750,175 A | 6/1988 | Brenneman et al. | 371/22 |
| 4,959,849 A | 9/1990 | Bhusri | 379/32 |
| 5,123,017 A | 6/1992 | Simpkins et al. | 371/15.1 |
| 5,233,600 A | 8/1993 | Pekarske | 370/14 |
| 5,313,628 A | 5/1994 | Mendelsohn et al. | 395/575 |
| 5,442,555 A | 8/1995 | Reifman et al. | 364/431.01 |
| 5,537,653 A | 7/1996 | Bianchini, Jr. | 395/183.01 |
| 5,631,847 A | 5/1997 | Kikinis | 364/514 R |
| 5,919,266 A | 7/1999 | Sud et al. | 714/13 |
| 6,003,081 A | 12/1999 | Cromer et al. | 709/224 |
| 6,052,796 A | 4/2000 | Croslin | 714/4 |

(Continued)

FOREIGN PATENT DOCUMENTS

JP        2001273020        10/2001

OTHER PUBLICATIONS

Daude, O. et al. "Method and System for Monitoring Dynamic Host Configuration Protocol (DHCP) Service in an Internet Protocol Network", IBM Patent application, IBM Filed Jun. 28, 2000, U.S. Appl. No. 09/605,464.

(Continued)

*Primary Examiner*—Thomas R. Peeso
(74) *Attorney, Agent, or Firm*—John R. Pivnichny; David R. Irvin

(57) ABSTRACT

A network management system determines whether end-to-end network paths are working, using network probes. A network component is deemed suspicious if included in every failed path, and deemed working if included in at least one working path. From the set of suspicious network components and the set of working components, a set of failed network components is deduced. The sets may be refined using SNMP to test visible components. In one embodiment, the set of failed network components is deduced by eliminating, from the set of suspicious network components, every network component that is included in the set of working network components. This may be done by finding the intersection of two sets: the set of suspicious network components, and the complement of the set of working network components, where the complement is with respect to the set of all network components.

18 Claims, 3 Drawing Sheets

U.S. PATENT DOCUMENTS

| | | |
|---|---|---|
| 6,151,688 A | 11/2000 | Wipfel et al. .................. 714/48 |
| 6,304,982 B1 | 10/2001 | Mongan et al. ............... 714/38 |
| 6,338,112 B1 | 1/2002 | Wipfel et al. ................ 710/269 |
| 6,347,074 B1 | 2/2002 | Croslin et al. .............. 370/228 |
| 6,353,898 B1 | 3/2002 | Wipfel et al. ................ 714/48 |
| 6,363,497 B1 | 3/2002 | Chrabaszcz .................. 714/13 |
| 6,397,247 B1 | 5/2002 | Shirakawa et al. ......... 709/223 |

OTHER PUBLICATIONS

Ahmed, M. "Network Fault Alerting System and Method", IBM Paent Application, IBM Filed Feb. 3, 2000, U.S. Appl. No. 09/497,572.

Bender, C. et al. "Identifying Faulty Network Components During a Network Exploration", IBM Patent Application, IBM Filed Jul. 17, 2001, U.S. Appl. No. 09,907,422.

PROBLEM DETERMINATION METHOD SUITABLE FOR USE WHEN A FILTER BLOCKS SNMP ACCESS TO NETWORK COMPONENTS

FIELD OF THE INVENTION

The present invention concerns the field of network management, and more particularly concerns problem determination in networks wherein a filter such as a firewall prevents a network management system from using SNMP to access at least one network component.

BACKGROUND

Two important trends are evident in the field of networking. One of these trends, which concerns electronic vandalism or hacking, stimulates the use of defensive measures such as network firewalls, routers, and load balancers with filters to thwart malicious traffic. The other trend, which concerns the way that services are provided commercially, engenders network configurations where end-to-end paths through a network may originate on one side of a filtering device and terminate on the other.

Traditional network management methods, which continue to be of great importance, typically rely on network management systems that communicate with their managed network components using the Simplified Network Management Protocol (SNMP). SNMP communications are often blocked deliberately by firewalls, however, as SNMP commands may be used to disrupt unprotected network components or to probe a network's architecture and configuration details, which may be proprietary.

This can result in a situation where a customer of a service provider is unable to isolate network and application problems, because the customer cannot view network components that lie beyond the service provider's firewall. Thus there is a need for a way to enable a network management system to gather information from network components that are visible using SNMP, as well as from network components that are not visible using SNMP due to filters, and to integrate the two kinds of information in order to provide problem determination support over relevant end-to-end paths through the network.

SUMMARY

The present invention enables a network management system to gather information from network components that are visible using SNMP, as well as from network components that are not visible using SNMP due to filtering devices such as firewalls, and to integrate the two kinds of information in order to provide problem determination support over relevant end-to-end paths through the network. The invention is suitable for application to networks where some of the paths share common network components, and some of the network components are not visible to the network management system using SNMP. Although the invention is described here in terms of SNMP, the invention applies as well when any other limited-visibility or single-node network management protocol, method, or tool is used instead of SNMP or in addition to SNMP. For example, traceroutes may be used. Here, such are called collectively "limited-visibility network management protocols," of which SNMP is one example.

The network management system determines whether each end-to-end path is working or failed, using network probes. A network component is deemed suspicious if it is included in every failed path. A network component is deemed working if it is included in at least one working path. From the set of suspicious network components and the set of working components, a set of failed network components is identified. Any of the three sets may be further refined upon testing visible network components using limited-visibility network management methods such as SNMP methods.

According to one embodiment of the invention, the set of suspicious network components is determined by the intersection of the sets of network components that are included in failed paths, and the set of working network components is determined by the union of the sets of network components that are included in the working paths. The set of failed network components is then deduced by eliminating, from the set of suspicious network components, any network component that is included in the set of working network components. This may be done by finding the intersection of two sets: the set of suspicious network components, and the complement of the set of working network components, where the complement is with respect to the set of all network components.

Thus, the network management system may draw together information that is visible using SNMP and information that is not, in order to isolate problems in network components that lie on either side of a firewall or other filtering device. These and other aspects of the invention will be appreciated more fully when considered in light of the following drawings and detailed description.

DETAILED DESCRIPTION

The present invention enables a network management system to gather information from network components that are visible using SNMP, as well as from network components that are not visible using SNMP because they lie behind filtering devices such as firewalls, and to integrate the two kinds of information in order to provide problem determination support over relevant end-to-end paths through the network. The invention is especially suitable for application to networks where some of the paths share common network components.

Figure 1:
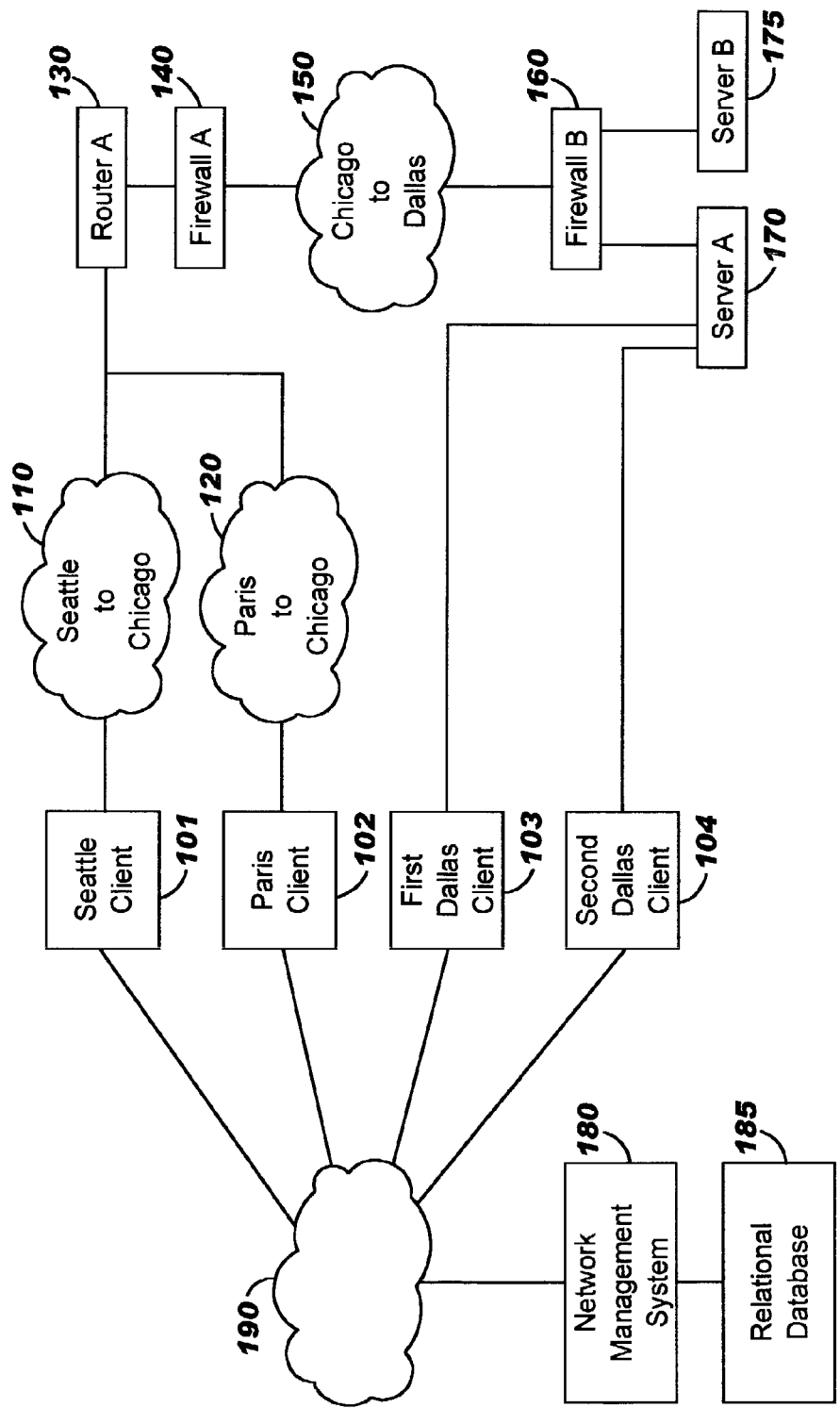
FIG. 1 shows an exemplary network to which the present invention may be suitably applied.

An example of such a network is provided by FIG. 1. The exemplary network of FIG. 1 includes the following network components: a first common carrier link 110 from Seattle to Chicago, a second common carrier link 120 from Paris to Chicago, a router A 130 in Chicago, a firewall A 140 in Chicago, a third common carrier link 150 from Chicago to Dallas, a firewall B 160 in Dallas, a server A 170 in Dallas, and a server B 175 in Dallas. Each of these network components is associated with a network component number as follows:

| | |
|---|---|
| first common carrier link (110) | network component 1 |
| second common carrier link (120) | network component 2 |
| router A (130) | network component 3 |
| firewall A (140) | network component 4 |
| third common carrier link (150) | network component 5 |
| firewall B (160) | network component 6 |
| server A (170) | network component 7 |
| server B (175) | network component 8 |

Router A 130 and firewall A 140 belong to a customer who places orders with a service provider who owns firewall B 160, server A 170, and server B 175. Four customer clients use the network to submit orders to the service provider. These are a Seattle client 101, a Paris client 102, a first Dallas client 103, and a second Dallas client 104. The Seattle client 101 and the first Dallas client 103 order using server A 170, whereas the Paris client 102 and the second Dallas client 104 order using server B 175.

Thus there are four end-to-end paths. The first path is from the Seattle client 101 to Server A 170, which path includes the first common carrier link 110, router A 130, firewall A 140, the third common carrier link 150, firewall B 160, and server A 170. The second path is from the Paris client 102 to Server B 175, which path includes the second common carrier link 120, router A 130, firewall A 140, the third common carrier link 150, firewall B 160, and server B 175. The third path is from the first Dallas client 103 to Server A 170, which path includes firewall B 160 and server A 170. The fourth path is from the second Dallas client 104 to Server B 175, which path includes firewall B 160 and server B 175.

The first path thus includes network components 1, 3, 4, 5, 6, and 7, and may therefore be represented by the set {1, 3, 4, 5, 6, 7}. In like manner, the second path includes network components 2, 3, 4, 5, 6, and 8, and may be represented by {2, 3, 4, 5, 6, 8}, the third path by {6, 7}, and the fourth by {6, 8}. The entire set of network components may be represented by {1, 2, 3,4, 5, 6, 7, 8}. In this example, network components 3,4, 5, and 6 are shared by—i.e., common to—the first and second paths, component 6 is shared by all four paths, component seven by the first and third paths, and component 8 by the second and fourth paths.

The four paths are monitored by a network management system 180, which is connected to the four customer clients 101–104, through a fourth common carrier link 190. Each of the four customer clients 101–104 periodically probes using end-to-end test transactions, which may include HTTP, Telnet, and FTP. A transaction may complete successfully, exceed a time threshold, or fail. Each of the customer clients 101–104 collects the results of the transactions in a file and sends the file to the network management system 180 using FTP. A daemon java application in the network management system 180 processes the received files and runs problem determination routines accordingly. Resulting information provided by the network management system 180 is stored and analyzed by a relational database 185 such as a DB2 database.

It is important to note that the configuration and network components shown in FIG. 1 are introduced here only to serve as a descriptive vehicle, and the invention is not so limited. For example, the invention is suitable for use with a wide variety of network components, for example including private links, local area networks, private branch exchanges, central office switches, multiplexors, packet and frame switches of various kinds, wireless links, and so forth, configured in a wide variety of ways beyond that shown in the figure. Additionally, the network management system 180 may be connected to the network components in various other ways, as would be obvious to those skilled in the art of network management. Moreover, although the invention is described here in terms of SNMP, the invention applies as well when any other limited-visibility or single-node network management protocol, method, or tool is used instead of SNMP or in addition to SNMP. For example, traceroutes may be used. In the claims that follow, such are called collectively "limited-visibility network management protocols," of which SNMP is one example.

Figure 2:
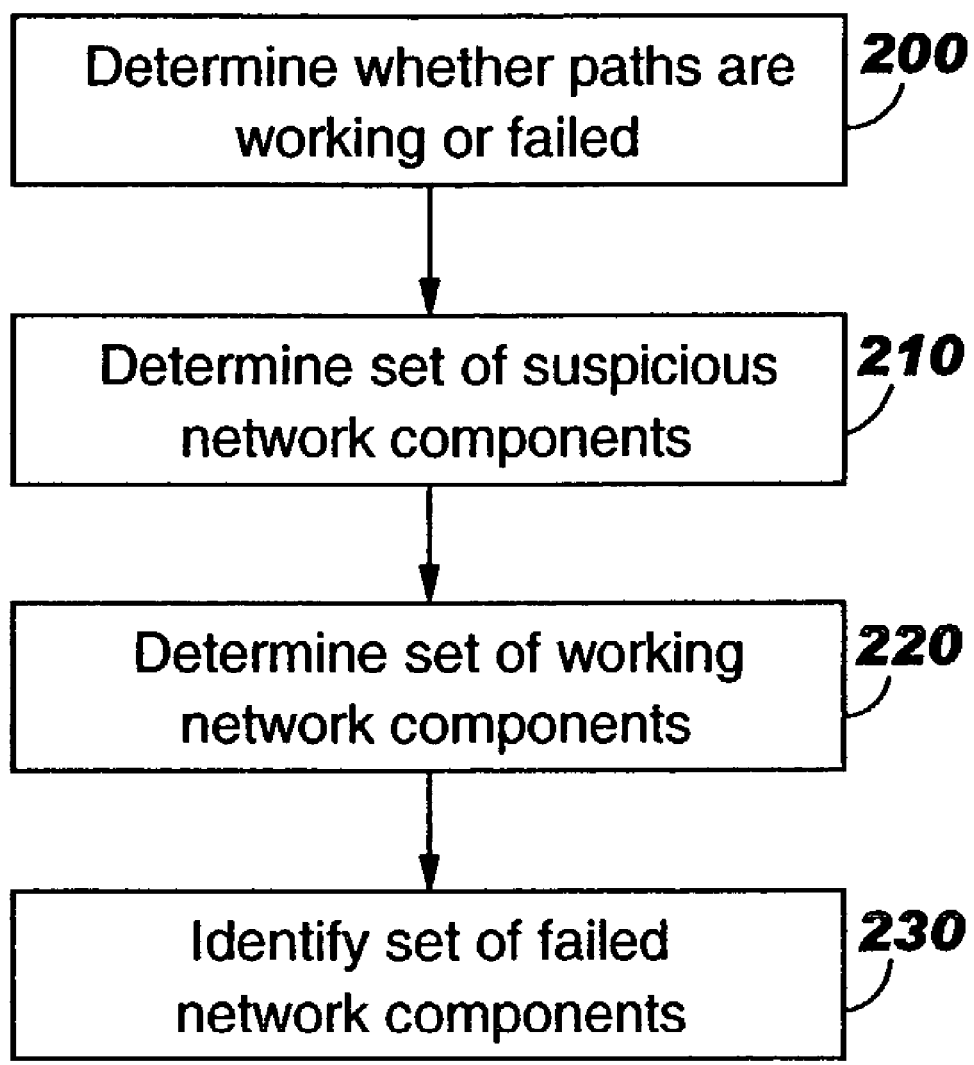
FIG. 2 shows operational aspects of an exemplary embodiment of the invention.

FIG. 2 shows operational aspects of the inventive method according to an exemplary embodiment of the invention. The network management system 180 determines whether each path is a working path or a failed path (step 200). This may be done by sending out network probes as-needed or periodically, preferably timed so as to report nearly simultaneously. In a preferred embodiment, each of the four customer clients 101–104 runs the IBM End-to-End Probe Platform (EPP), which is a java based measurement product. EPP conducts and measures end-user transactions without requiring modification of the measured application or network. EPP is described further at http://w3.research.ibm.com/epp/.

The failed paths are then analyzed to determine a set of suspicious network components (step 210). The suspicious network components are those network components in common to every failed path. The working paths are then analyzed to determine a set of working network components (step 220). A network component is a working network component if it is included in at least one working path. A set of failed network components is then identified, based on the set of suspicious network components and the set of working network components (step 230).

The failed network components may be identified by eliminating, from the set of suspicious network components, every network component included in the set of working network components. In addition, suspicious network components that can be seen by the network management system 180 using SNMP may be examined conventionally using SNMP-based network-management methods, and eliminated from the set of suspicious network components, or added to the set of working network components, if found to be working; conversely, network components that can be seen by the network management system 180 using SNMP may be examined conventionally, and added to the set of suspicious network components or to the set of failed network components if found to be failed.

The foregoing may be illustrated by returning to the four-path example introduced above, again with reference to FIG. 1. Suppose in this example that the first and third paths are failed, but the second and fourth paths are working. The first path is described, with reference to network component numbers, by {1, 3, 4, 5, 6, 7}, and the third path is described by {6,7}. Thus the set of suspicious network components includes the network components common to {1, 3, 4, 5, 6, 7} and {6, 7}, which reduces to {6, 7}. The second path is {2, 3, 4, 5, 6, 8}, and the fourth is {6,8}; thus the set of working networking components is {2, 3, 4, 5, 6, 8} . Of the suspicious network components {6, 7}, network component 6 is included also in the set of working network components {2, 3, 4, 5, 6, 8}. Therefore, network component 6 is eliminated from the set of suspicious network components {6, 7}. This elimination leaves network component 7, which is server A 170, as the failed network component.

Now suppose that the first and second paths, respectively {1, 3, 4, 5, 6, 7} and {2, 3, 4, 5, 6, 8}, are found to be failed, but the third and fourth paths, respectively {6, 7} and {6, 8}, are found to be working. The set of suspicious network components is then {3, 4, 5, 6}, and the set of working network components is {6, 7, 8}. Accordingly, the set of failed network components is {3, 4, 5} However, the network management system 180 can test network components 3 and 4 using SNMP methods, and eliminate either from the set of failed network components if found to be working.

Figure 3:
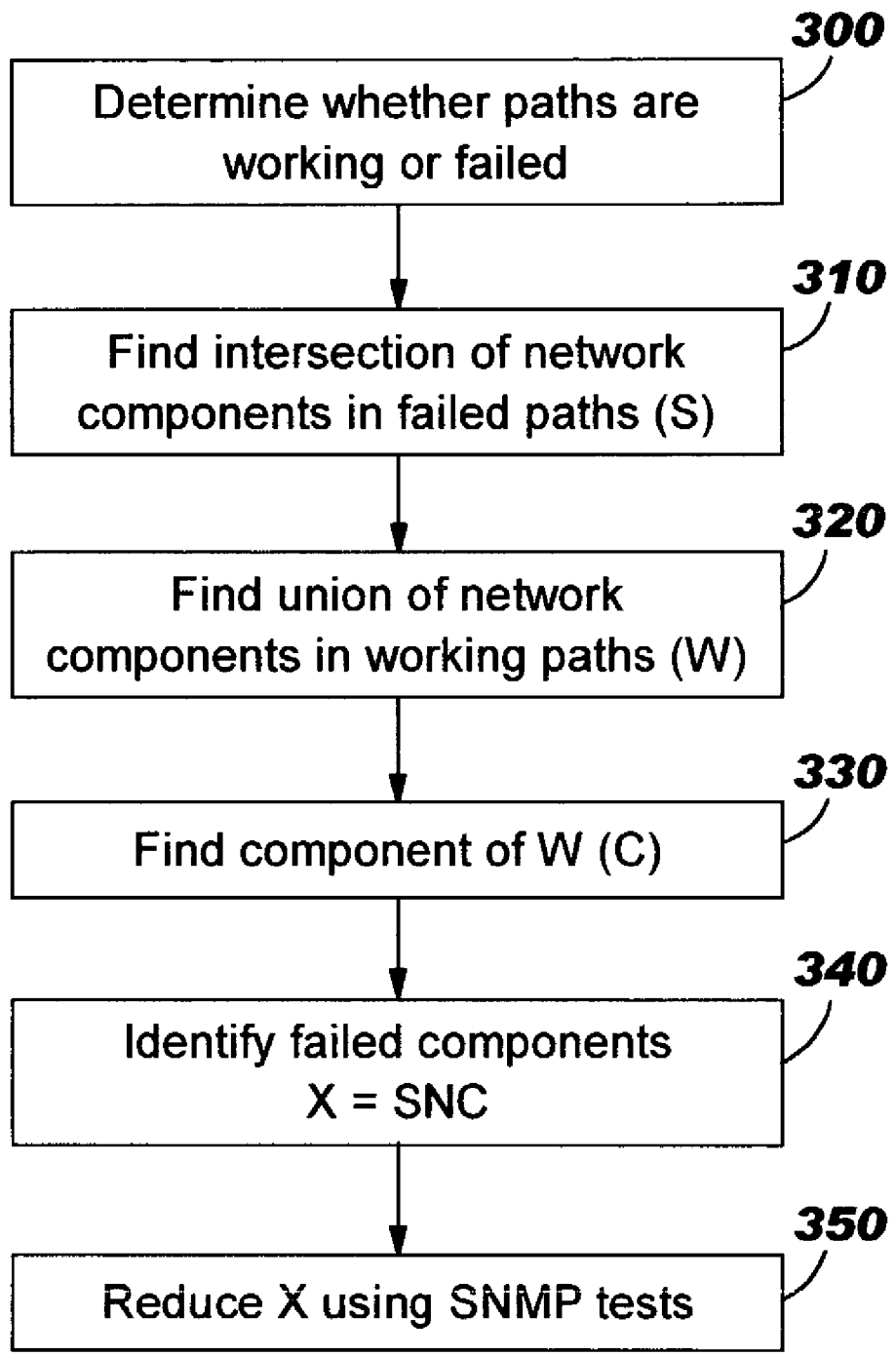
FIG. 3 shows operational aspects of another exemplary embodiment of the invention.

FIG. 3 shows operational aspects of another exemplary embodiment of the invention, where there are M paths and N network components. As described above, the network management system 180 determines whether each path is a working path or a failed path (step 300). Let there be $M_1$ failed paths and $M_2$ working paths, where $M=M_1+M_2$. Let $F_i$ be the set of network components included in the $i^{th}$ failed path, i=1, $M_1$, and let $W_j$ be the set of network components in the $j^{th}$ working path, j=1, $M_2$. Then, the set S of suspicious network components is found (step 310) by taking the intersection $S=\cap F_i$ over i=1, $M_1$, which determines the network components that are common to all of the failed paths. Let W be the set of working network components. Set W is found (step 320) by taking the union $W=\cup W_j$ over j=1, $M_2$, which determines the network components that are included in at least one working path. Let U be the universal set of network components, i.e, the set of the N network components mentioned above. The complement of set W with respect to set U, which complement is called here set C, is then found (step 330); set C thus includes all of the network components that are not included in any working path. The set X of failed network components is then deduced (step 340) as $X=S\cap C$. The set X may then be reduced by applying SNMP methods (step 350), as described above.

The running example may again be used for illustration. In the case where the first and third paths are failed, but the second and fourth paths are working, N=8, M=4, and $M_1=M_2=2$. Set $F_1$ is {1, 3, 4, 5, 6, 7}, and set $F_2$ is {6, 7}, representing the first and third paths, respectively, which are the failed paths. Then, set S, which is the set of suspicious network components, is given by $S=\cap F_i$ over i=1,2, or S={6,7}. Set $W_1$ is {2, 3, 4, 5, 6, 8} and set $W_2$ is {6, 8}, representing the second and fourth paths respectively, which are the working paths. The set W of working network components is then $W=\cup W_1$ over j=1, 2 or W={2, 3, 4, 5, 6, 8}. The universal set U is {1, 2, 3, 4, 5, 6, 7, 8}. Hence, the complement of W with respect to U is C={1, 7}, and the set of failed network components X is $S\cap C$, or X={7}, again identifying server A 170.

Again in the running example, for the case where the first and second paths are failed, but the third and fourth paths are working, N=8, M=4, and $M_1=M_2=2$. Set $F_1$ is {1, 3, 4, 5, 6, 7}, and set $F_2$ is {2, 3, 4, 5, 6, 8}, representing the first and second paths, respectively, which are the failed paths. Then, set S, which is the set of suspicious network components, is given by $S=\cap F_i$ over i=1,2, or S={3, 4, 5, 6}. Set $W_1$ is {6, 7} and set $W_2$ is {6, 8},representing the third and fourth paths respectively, which are the working paths. The set W of working network components is then $W=\cup W_j$ over j=1, 2, or W={6, 7, 8} . The universal set U is {1, 2, 3, 4, 5, 6, 7, 8}. Hence, the complement of W with respect to U is C={1, 2, 3, 4, 5}, and the set of failed network components X is $S\cap C$, or X={3, 4, 5}. Network components 3 and 4 are within SNMP view of the network management system 180. These components may be tested accordingly, and eliminated from set X or not, depending on the results of the SNMP tests.

From the preceding description, those skilled in the art will now appreciate that the present invention enables a network management system to gather information from network components that are visible using limited-visibility network management protocols such as SNMP, as well as from network components that are not visible due to filtering devices such as firewalls, and to integrate the two kinds of information in order to provide problem determination support over relevant end-to-end paths through the network. However, the invention is not so limited. Rather, the foregoing description is illustrative rather than limiting, and the invention is limited only by the claims that follow.

I claim:

1. A problem determination method suitable for a network that has a plurality of paths and a plurality of network components, at least two of which paths include at least one of the network components in common, said method comprising the steps of:
  determining whether each path of the plurality of paths is a working path or a failed path;
  determining a set of suspicious network components, each of which suspicious network component is included in every failed path;
  determining a set of working network components, each of which working network component is included in at least one working path; and
  identifying a set of failed network components by analyzing the set of suspicious network components and the set of working network components.

2. The method of claim 1, wherein the step of identifying the set of failed network components includes a step of eliminating, from the set of suspicious network components, every network component included in the set of working network components.

3. The method of claim 1,
  wherein the step of determining the set of suspicious network components includes finding an intersection of sets of network components included in the failed paths;
  wherein the step of determining the set of working network components includes finding a union of sets of network components included in the working paths; and
  wherein the step of identifying the set of failed network components includes finding an intersection of the set of suspicious network components and a set which is the complement, with respect to a set of all the network components, of the set of working network components.

4. The method of claim 1, wherein the steps of determining the set of suspicious network components, determining the set of working network components, and identifying the set of failed network components, are performed using a relational database.

5. The method of claim 1, wherein the step of determining whether each path is a working path or a failed path is performed by a network management system, wherein the network management system has access to at least a first network component using a limited-visibility network management protocol and uses the limited-visibility network management protocol to determine whether the first network component is working or failed, and the network management system is blocked from using the limited-visibility network management protocol to access at least a second network component and uses a network probe to determine whether a path that includes the second network component is a working path or a failed path.

6. The method of claim 5, wherein the limited-visibility network management protocol is SNMP.

7. The method of claim 5, wherein the network management system is blocked from using the limited-visibility network management protocol to access at least the second network component by a firewall.

8. The method of claim 5, wherein the network management system is blocked from using the limited-visibility network management protocol to access at least the second network component by a router.

9. The method of claim 5, wherein the network management system is blocked from using the limited-visibility network management protocol to access at least the second network component by a load balancer.

10. A problem determination method suitable for a network that has a plurality of paths and a plurality of network components, at least two of which paths include at least one of the network components in common, said method comprising the steps of:
   determining whether each path of the plurality of paths is a working path or a failed path;
   determining a set of suspicious network components, each of which suspicious network component is included in every failed path, by finding an intersection of sets of network components included in the failed paths;
   determining a set of working network components, each of which working network component is included in at least one working path, by finding a union of sets of network components included in the working paths; and
   identifying a set of failed network components by eliminating, from the set of suspicious network components, every network component included in the set of working network components, by finding an intersection of the set of suspicious network components and a set which is a complement, with respect to a set of all the network components, of the set of working network components;
   wherein the step of determining whether each path is a working path or a failed path is performed by a network management system, wherein the network management system has access to at least a first network component using a limited-visibility network management protocol and uses the limited-visibility network management protocol to determine whether the first network component is working or failed, and the network management system is blocked from using the limited-visibility network management protocol to access at least a second network component and uses a network probe to determine whether a path that includes the second network component is a working path or a failed path.

11. The method of claim 10, wherein the limited-visibility network management protocol is SNMP.

12. A problem determination method suitable for a network that has a plurality of paths and a plurality of network components, at least two of which paths include at least one of the network components in common, said method comprising the steps of:
   determining whether each path of the plurality of paths is a working path or a failed path;
   determining a set of suspicious network components, each of which suspicious network component is included in every failed path, by finding an intersection of sets of network components included in the failed paths;
   determining a set of working network components, each of which working network component is included in at least one working path, by finding a union of sets of network components included in the working paths; and
   identifying a set of failed network components by eliminating, from the set of suspicious network components, every network component included in the set of working network components, by finding the intersection of the set of suspicious network components and a set which is a complement, with respect to a set of all the network components, of the set of working network components;
   wherein the steps of determining the set of suspicious components, determining the set of working network components, and identifying the set of failed network components, are performed using a relational database.

13. A problem determination method suitable for a network that has a plurality of paths and a plurality of network components, at least two of which paths include at least one of the network components in common, said method comprising the steps of:
   determining whether each path of the plurality of paths is a working path or a failed path;
   determining a set of suspicious network components, each of which suspicious network component is included in every failed path, by finding an intersection of sets of network components included in the failed paths;
   determining a set of working network components, each of which working network component is included in at least one working path, by finding a union of sets of network components included in the working paths; and
   identifying a set of failed network components by eliminating, from the set of suspicious network components, any network component included in the set of working network components, by finding an intersection of the set of suspicious network components and a set which is a complement, with respect to a set of all the network components, of the set of working network components;
   wherein the steps of determining the set of suspicious components, determining the set of working network components, and identifying the set of failed network components, are performed using a relational database; and further
   wherein the step of determining whether each path is a working path or a failed path is performed by a network management system, wherein the network management system has access to at least a first network component using a limited-visibility network management protocol and uses the limited-visibility network management protocol to determine whether the first network component is working or failed, and the network management system is blocked from using the limited-visibility network management protocol to access at least a second network component and uses a network probe to determine whether a path that includes the second network component is a working path or a failed path.

14. The method of claim 13, wherein the limited-visibility network management protocol is SNMP.

15. A program storage device readable by a machine, tangibly embodying a program of instructions executable by the machine to perform method steps for a problem determination method suitable for a network that has a plurality of paths and a plurality of network components, at least two of which paths include at least one of the network components in common, said method steps comprising:
- determining whether each path of the plurality of paths is a working path or a failed path;
- determining a set of suspicious network components, each of which suspicious network component is included in every failed path;
- determining a set of working network components, each of which working network component is included in at least one working path; and
- identifying a set of failed network components by analyzing the set of suspicious network components and the set of working network components.

16. A program storage device readable by a machine, tangibly embodying a program of instructions executable by the machine to perform method steps for a problem determination method suitable for a network that has a plurality of paths and a plurality of network components, at least two of which paths include at least one of the network components in common, said method steps comprising:
- determining whether each path of the plurality of paths is a working path or a failed path;
- determining a set of suspicious network components, each of which suspicious network component is included in every failed path, by finding an intersection of sets of network components included in the failed paths;
- determining a set of working network components, each of which working network component is included in at least one working path, by finding a union of sets of network components included in the working paths; and
- identifying a set of failed network components by eliminating, from the set of suspicious network components, any network component included in the set of working network components, by finding an intersection of the set of suspicious network components and a set which is a complement, with respect to a set of all the network components, of the set of working network components;
- wherein the step of determining whether each path is a working path or a failed path is performed by a network management system, wherein the network management system has access to at least a first network component using a limited-visibility network management protocol and uses the limited-visibility network management protocol to determine whether the first network component is working or failed, and the network management system is blocked from using the limited-visibility network management protocol to access at least a second network component and uses a network probe to determine whether a path that includes the second network component is a working path or a failed path.

17. The program storage device of claim 16, wherein the limited-visibility network management protocol is SNMP.

18. A program storage device readable by a machine, tangibly embodying a program of instructions executable by the machine to perform method steps for a problem determination method suitable for a network that has a plurality of paths and a plurality of network components, at least two of which paths include at least one of the network components in common, said method steps comprising:
- determining whether each path of the plurality of paths is a working path or a failed path;
- determining a set of suspicious network components, each of which suspicious network component is included in every failed path, by finding an intersection of sets of network components included in the failed paths;
- determining a set of working network components, each of which working network component is included in at least one working path, by finding a union of sets of network components included in the working paths; and
- identifying a set of failed network components by eliminating, from the set of suspicious network components, any network component included in the set of working network components, by finding the intersection of the set of suspicious network components and a set which is a complement, with respect to a set of all the network components, of the set of working network components;
- wherein the steps of determining the set of suspicious components, determining the set of working network components, and identifying the set of failed network components, are performed using a relational database.

* * * * *